United States Patent
Khatib et al.

(10) Patent No.: US 8,527,646 B2
(45) Date of Patent: Sep. 3, 2013

(54) RENDERING IN A MULTI-USER VIDEO EDITING SYSTEM

(75) Inventors: Maher Khatib, Montreal (CA); Min Wei, Lasalle (CA)

(73) Assignee: Avid Technology Canada Corp., Montreal (CA)

( * ) Notice: Subject to any disclaimer, the term of this patent is extended or adjusted under 35 U.S.C. 154(b) by 780 days.

(21) Appl. No.: 12/754,843

(22) Filed: Apr. 6, 2010

(65) Prior Publication Data

US 2010/0262710 A1    Oct. 14, 2010

Related U.S. Application Data (60) Provisional application No. 61/169,125, filed on Apr. 14, 2009, provisional application No. 61/239,600, filed on Sep. 3, 2009.

(51) Int. Cl.
*G06F 15/16*    (2006.01)

(52) U.S. Cl.
USPC ............. 709/231; 709/219; 707/603; 725/32; 725/46; 715/751

(58) Field of Classification Search
USPC ................... 709/231, 219; 707/603; 725/32, 725/46; 715/751
See application file for complete search history.

(56) References Cited

U.S. PATENT DOCUMENTS

| | | | |
|---|---|---|---|
| 5,682,326 A | 10/1997 | Klingler et al. | |
| 6,182,109 B1 | 1/2001 | Sharma et al. | |
| 6,573,898 B1 | 6/2003 | Mathur et al. | |
| 7,051,038 B1 * | 5/2006 | Yeh et al. | 707/603 |
| 7,103,839 B1 | 9/2006 | Natkin et al. | |
| 8,187,104 B2 * | 5/2012 | Pearce | 463/43 |
| 2006/0015904 A1 * | 1/2006 | Marcus | 725/46 |
| 2006/0236245 A1 | 10/2006 | Agarwal et al. | |
| 2007/0128899 A1 * | 6/2007 | Mayer | 439/152 |
| 2009/0131177 A1 * | 5/2009 | Pearce | 463/43 |
| 2009/0249222 A1 * | 10/2009 | Schmidt et al. | 715/751 |

(Continued)

FOREIGN PATENT DOCUMENTS

| | | |
|---|---|---|
| EP | 0794490 | 9/1997 |
| WO | WO 00/63913 | 10/2000 |
| WO | WO 02/088938 | 11/2002 |

OTHER PUBLICATIONS

Little, Thomas D.C., "Multimedia at Work", IEEE, 1070-986X/99, 1999, 3 pages.

*Primary Examiner* — Thu Ha Nguyen
(74) *Attorney, Agent, or Firm* — Oliver Strimpel (57) ABSTRACT

Methods and systems for remotely editing a video file involve: receiving, at a server, a video editing command from a remote client; modifying, at the server, a virtual representation of a media file in accordance with the received command, the virtual representation including a reference to a source media file stored on a storage device, the storage device being connected to the server over a high-speed link; and generating and transmitting, from the server to the remote client, a proxy representation of the source media file modified by the editing commands, wherein the various regions of the proxy representation are rendered either in the background or in real-time according to their complexity. Rendered frames, whether generated in the background or in real time, are stored for reuse. Individual frames of the edited video file may be transmitted upon request from a client. Simultaneous editing of independent projects by multiple users connected to the server via multiple thin clients is supported.

22 Claims, 5 Drawing Sheets

(56) References Cited

U.S. PATENT DOCUMENTS

| | | | |
|---|---|---|---|
| 2009/0297022 A1* | 12/2009 | Pettigrew et al. | 382/162 |
| 2009/0316671 A1* | 12/2009 | Rolf et al. | 370/338 |
| 2010/0082774 A1* | 4/2010 | Pitts | 709/219 |
| 2012/0180083 A1* | 7/2012 | Marcus | 725/32 |
| 2013/0129317 A1* | 5/2013 | Moorer | 386/241 |
| 2013/0132462 A1* | 5/2013 | Moorer | 709/203 |

\* cited by examiner

RENDERING IN A MULTI-USER VIDEO EDITING SYSTEM

CROSS REFERENCE TO RELATED APPLICATIONS

This application claims the benefit of priority to U.S. provisional patent application Ser. No. 61/169,125, filed Apr. 14, 2009, entitled "Multi-User Remote Video Editing" and to U.S. provisional patent application Ser. No. 61/239,600, filed Sep. 3, 2009, entitled "Rendering in a Multi-User Video Editing System," the contents of each of which are incorporated herein by reference. This application is related to U.S. patent application Ser. No. 12/754,826, entitled "Multi-User Remote Video Editing," filed on even date herewith, which is wholly incorporated herein by reference.

BACKGROUND

Computers running video editing software may be used to edit media containing video and/or audio by performing operations including cutting, resizing, layering, compositing, tiling, looping, and adding graphics and effects. The source material may be a digital media file encoded in one of a variety of formats; moreover, an analog source medium may be converted into a digital file, edited, and optionally converted back into analog format.

Traditional computer-based video editing systems may be configured to accommodate single or multiple users, though each configuration may have undesirable characteristics. A single-user editing system, for example, does not permit collaboration or resource-sharing among users and may suffer from underutilization. For example, it may be idle during the times that the single user is not performing editing operations, or may be nearly idle when the performed editing operations are not computationally expensive. Because a single-user editing system must be robust enough to handle the most complex editing tasks the user may execute, and because this robustness may come with an associated expense, any idle time the single-user system encounters wastes the capital invested in the system.

A traditional multi-user system, on the other hand, may permit its users to share centrally located media. For example, a file server may host a single copy of a media file and distribute it to client workstations connected over a local-area network. Alternatively, an http server may stream a media file to client workstations connected via the Internet. In either case, the centralized storage of the media file may increase the overall efficiency of the video-editing application. There are several disadvantages, however, to traditional multi-user editing systems. For one, they require both a powerful server to host and distribute the media files and powerful workstation clients to perform the actual editing. The workstation clients, like the single-user systems described above, must be robust enough to handle complex editing tasks yet may suffer from underutilization because a user at a given workstation will not always use the full power of the clients. Furthermore, a file or http server lacks the ability to intelligently process a file or stream before sending it to the client. For example, a complex professional-quality editing project may layer several audio and video clips together simultaneously to create composited media. The file or http server, however, must transmit the entirety of each layer to the requesting client, further taxing the system.

Another disadvantage of traditional multi-user systems is the large amount of network bandwidth they require. "Online" editing—the direct modification of a source media file by a client—requires either that the client first downloads the entire source media file from the server to local storage, uploading the media file when editing is complete, or that the client access the source media file via a networked file system. In either case, the large amount of network traffic generated between the server and the client requires a very high-bandwidth and expensive client/server network. To alleviate some of this traffic, traditional multi-user systems may use "offline" editing, in which a reduced-sized copy of the source media (a "proxy") is generated and sent to the client in lieu of the original, larger-sized media file. The client may edit the proxy, and the sequence of editing command performed on the proxy (the "timeline") may be applied (or "relinked") to the source media. Offline editing, however, suffers from the disadvantage that a significant amount of network and client processing power is still required to transmit and edit the proxy, in addition to the wasted time, processing resources and storage required to generate these proxies. Furthermore, during the time that user is editing an offline proxy, the source media may be changed by, for example, replacing the original media or adding new source media to the project thus necessitating the laborious task of keeping track of pre-generated proxies and continuously synchronizing them with the original media. Finally, complex editing functions, such as certain high-end effects, cannot be performed offline and must be executed online.

Furthermore, traditional remote-access video systems generally do not permit the precise, fast, and frame-by-frame control of source media required for video editing. Most video encoding schemes use different types of frames, not all of which are self-contained. For example, a given frame may be a fully-specified picture frame known as an intra-coded picture frame or I-frame. Other frames, however, are not fully specified, and instead capture differences between the current frame and the last I-frame. These frames are known as pre-dicted-picture frames ("P-frames") or bipredicted-picture frames ("B-frames"). If a user requests a frame that happens to be a P- or B-frame, an editing application must backtrack to the last I-frame and then track forward through the intermediate P- and B-frames, reconstructing the requested frames along the way. Fast execution of this operation, however, requires local access to the entire media file, which for traditional remote-access systems means downloading the entire media file and thereby incurring the network bandwidth penalties described above. Without local access to the source media file, a remote client estimates the position in the media file that a requested frame occupies, and any errors in the estimation incur a time penalty in the frame seek time.

Many of the above disadvantages are exacerbated by higher-resolution video formats, such as HDTV. The larger resolutions and corresponding file sizes of HDTV-like media files require both increased processing power to analyze and greater network bandwidths to transport. This trend will only continue as the resolution and quality of video signals increase, requiring ever-increasing amounts of client processing power and network speeds. Clearly, a need exists for a collaborative, multi-user video editing system that reduces or eliminates the dependency between media file size and client processing power/network bandwidth.

SUMMARY

Embodiments of the invention include systems and methods for remote video editing of a media project. Projects undergoing editing are transmitted in the form of a low-bandwidth representation to one or more clients from one or more servers over a network. The embodiments facilitate optimal use of server resources for rendering and transmitting the low bandwidth representation to the clients in a multi-user environment.

In general, in one aspect, a system for remote video editing includes: a storage device for storing a source media file; an input for receiving, over a network video editing commands pertaining to the source media file; a virtual representation of the source media file, the virtual representation comprising the editing commands and a link to the source media file; a complexity evaluator that determines a complexity for rendering a proxy representation of a region of the virtual representation, wherein rendering involves applying the received video editing commands for the region to the source media file; a render scheduler that dispatches the region for rendering to a background rendering engine if the complexity of the region exceeds a predetermined threshold, wherein the background rendering engine renders the region by applying the received editing commands to a portion of the source media file corresponding to the region and stores the rendered region in a render cache; and a media delivery engine that delivers the proxy representation of the edited source media file, wherein for each region of the virtual representation, if a rendering of the region is present in the render cache, the media delivery engine retrieves the region from the render cache and transmits the region over the network, and if a rendering of the region is not present in the render cache, the media delivery engine retrieves a portion of the source media file corresponding to the region, renders the region in real-time using a real-time rendering engine by applying the received video editing commands to the retrieved portion of the source media file, and transmits the region over the network.

Various embodiments include one or more of the following features. The real-time rendering engine stores the rendered region in the rendering cache. The proxy representation is a video stream and the media delivery engine is a streaming engine. The region of the virtual representation comprises one or more frames of the source media files having the video editing commands applied thereto. A first user is connected to the video editing system over the network, and the video editing system is configured to receive, over the network, video editing commands from the first user, the commands from the first user being associated with the virtual representation. The system further includes a plurality of virtual representations including the first-mentioned virtual representation, each of the plurality of virtual representations being associated with one of a plurality of users connected to the video editing system over the network, the plurality of users including the first user, wherein the video editing system is configured to receive, over the network, video editing commands from each of the plurality of connected users, each received command pertaining to one of the plurality of virtual representations associated with the one of the plurality of users from whom the command was received. A processing resource level allocated to one or more of the plurality of connected users is dynamically dependent on the number of connected users. The processing resource level allocated to one or more of the plurality of connected users includes an allocation for background rendering. The processing resource level allocated to one or more of the plurality of connected users includes an allocation of foreground processing resources for real-time rendering and transmitting the proxy representation over the network. A processing resource level allocated to a connected user is based in part on a weight assigned to the user.

In general, in another aspect, a system for remote video editing includes: a client comprising: an input for receiving a proxy representation of media; a processor for decoding the proxy representation; a graphical user interface for displaying content represented by the decoded proxy representation; a user input for facilitating entry of commands for editing the proxy representation; and an output for transmitting the editing commands, and a server for receiving the editing commands, applying the editing commands to a source media file, and generating the proxy representation in accordance with the source media file and the editing commands, wherein, the proxy representation is generated by a background process for regions of the source media file for which applying the editing commands involves a computational load exceeding a predetermined threshold, and the proxy representation is generated in real-time for regions of the source file for which applying the editing commands involves a computational load below the predetermined threshold.

Various embodiments include one or more of the following features. The client is one of a desktop computer, workstation, laptop computer, netbook, and smartphone. The proxy representation comprises a media stream. The proxy representation includes one or more individual frames requested via the user input, the one or more individual frames corresponding to application of the editing commands to the source media file.

In general, in yet another aspect, a method for remotely editing a video file includes: receiving, at a server, a video editing command from a remote client; modifying, at the server, a virtual representation of a media file in accordance with the received command, the virtual representation comprising a reference to a source media file stored on a storage device, the storage device being connected to the server over a high-speed link; and rendering and transmitting, from the server to the remote client, a proxy representation of the source media file modified by the editing commands, wherein regions of the proxy representation for which rendering the proxy representation requires computational resources that exceed a threshold are rendered by a background rendering process, and wherein the remaining regions of the proxy representation are rendered in real time.

Various embodiments include one or more of the following features. The server includes a plurality of virtual representations, further including receiving video editing commands from a plurality of remote clients, each of the remote clients being associated with a corresponding virtual representation, wherein each of the editing commands pertains to the one of the plurality of virtual representations corresponding to the client from which the command was received. The server stores the proxy representation in a rendering cache.

DETAILED DESCRIPTION

A multi-user video editing system in which the video editing functions are performed at a centralized server is described in related U.S. Provisional Patent Application Ser. No. 61/169,125, filed Apr. 14, 2009, which is incorporated herein in its entirety.

Figure 1:
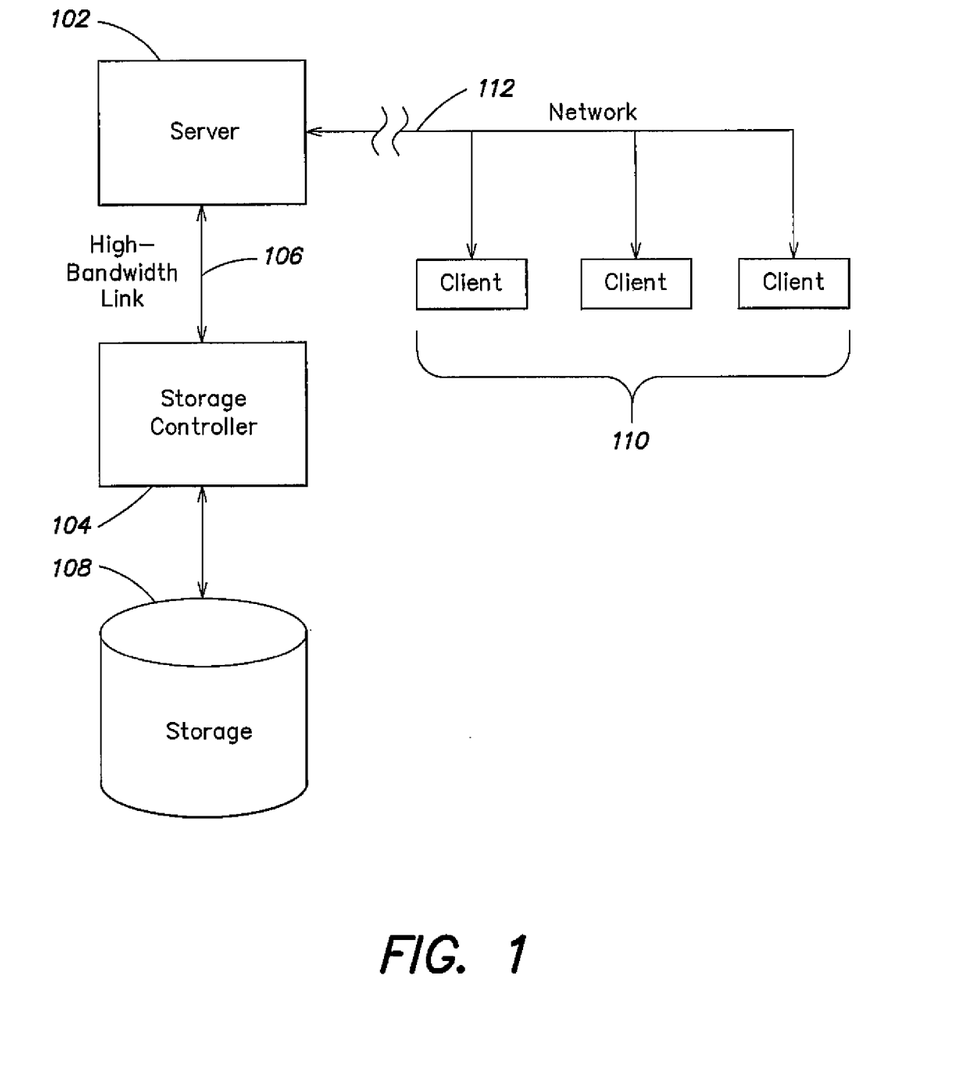
FIG. 1 illustrates one embodiment of a client/server architecture in accordance with the invention.

FIG. 1 illustrates one embodiment of a client/server architecture in accordance with the invention. Server 102 is connected to storage controller 104 via high-bandwidth link 106, and the storage controller manages one or more storage devices 108. The high-bandwidth link may be implemented using such protocols as Fibre Channel, InfiniBand, or 10 Gb Ethernet, and may support bandwidths on the order of gigabits per second. The server communicates with one or more remotely located clients 110 over low-bandwidth network 112. The low-bandwidth network may be, for example, an Ethernet or wireless network (limited to bandwidths on the order of megabits per second) or an Internet connection (limited to bandwidths less than one megabit per second). The server may be a single device or a plurality of devices connected in parallel. In some embodiments, the server is a dedicated machine with a known address. In other embodiments, the server comprises one or machines accessed over a network, for example server forming part of a leased computing and storage resource in the "cloud." Other server configurations are possible. In one embodiment, the server is a video-editing application server. The storage controller and storage device may be any of numerous commercially available storage solutions, such as direct-attached storage or network-attached storage.

Users interact with the video editing system via a client computer 110 that is connected via low-bandwidth network 112 to server 102, which performs all the video editing operations, and provides a virtual representation of the current state of the media project to the client user. The original media files are handled only by the server, and may be stored on the storage devices, or on other servers (not shown) connected to the above-mentioned server over a high-bandwidth link.

A media project for creating a video composition generally progresses through three principal phases—capture phase, edit phase, and export phase. During the capture phase, the editors obtain the original media files to be used in creating the composition. During the edit phase, the editors create the video composition by editing, compositing, adding effects, color correcting, and performing other functions using the original media files. Finally, the export phase generates and exports the version to be delivered, whether by over-the-air broadcast, by writing to a storage medium such as DVD or tape, or other means. The systems and methods described herein refer to the edit phase. The purpose of the rendering and compositing functions performed during the edit phase serve to provide the editor with a virtual representation of the state of work-in-progress, i.e., what the project as represented by the timeline would look like when played back.

Figure 2:
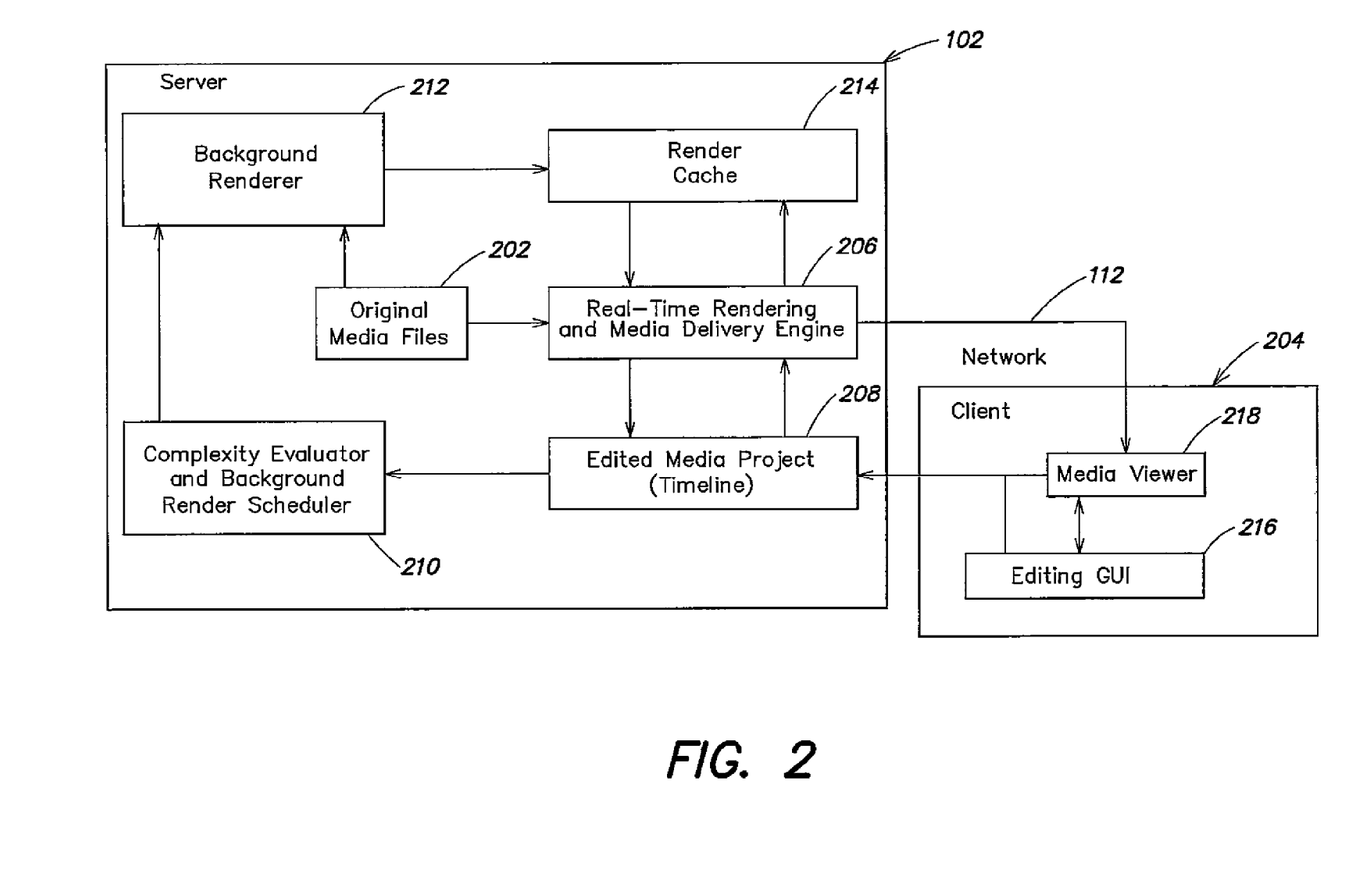
FIG. 2 is a block diagram illustrating the components of a server and the interaction between a server and a client in the multi-user remote video editing system of FIG. 1.

FIG. 2 illustrates the basic interaction between a server and a client. Server 102 (and its associated storage devices) includes original media files 202, which include the video and audio source material for generating a video composition through the editing process. The server also includes an engine for compositing the media files and for generating a proxy representation of the current state of the media project, video composition and delivering it over the network to client 204. Throughout the description that follows, the proxy representation may be an on-the-fly video stream representing the current state of the video composition with the editing commands applied to the source media files, or it may be one or more individual frames represented in a compressed format, such as PEG, or may include another compact representation of the video composition. The server also stores a virtual representation of the current state of edited media project 208, which includes the editing commands received by the server, and links to original media files 202. In the described embodiment the edited media project is represented as a timeline. The server transmits the proxy representation to client 204 over network 112, and a user may view the stream at the client. The server also includes complexity evaluator and background render scheduler 210, background renderer 212, and render cache 214, which will we describe in detail below.

When a user requests playback of the timeline, rendering and media delivery engine 206 sends the current state of the composition over network 112 to the client. If any of the requested content has already been rendered, it retrieves the rendered material from render cache 214 and transmits it to the client. If it has not been rendered, the engine renders the requested portion of the timeline in real-time before transmitting it to the client. It also stores any frames rendered in real-time in the render cache for subsequent reuse.

Client 204 includes editing graphical user interface (GUI) 216 for accepting the user's editing commands. The editing commands entered by the user are transmitted back to the server, which collects the commands in media project file 208 that includes a representation of the project timeline. As soon as they are received at the server, the edit commands are implemented in the media project file, and the timeline is updated accordingly. Only renderings of the current state of the timeline are streamed back to the user upon request; invalidated frames are never streamed. Neither the entire original media file nor any entire reduced-size version thereof need be transmitted to the client, and the client itself may not process any editing commands. Client 204 includes media viewer 218 for displaying received media content to a user.

We now describe how the system schedules and prioritizes the playback, streaming, and editing experience with a view to optimizing the editing experience for the set of connected client editors.

Figure 3:
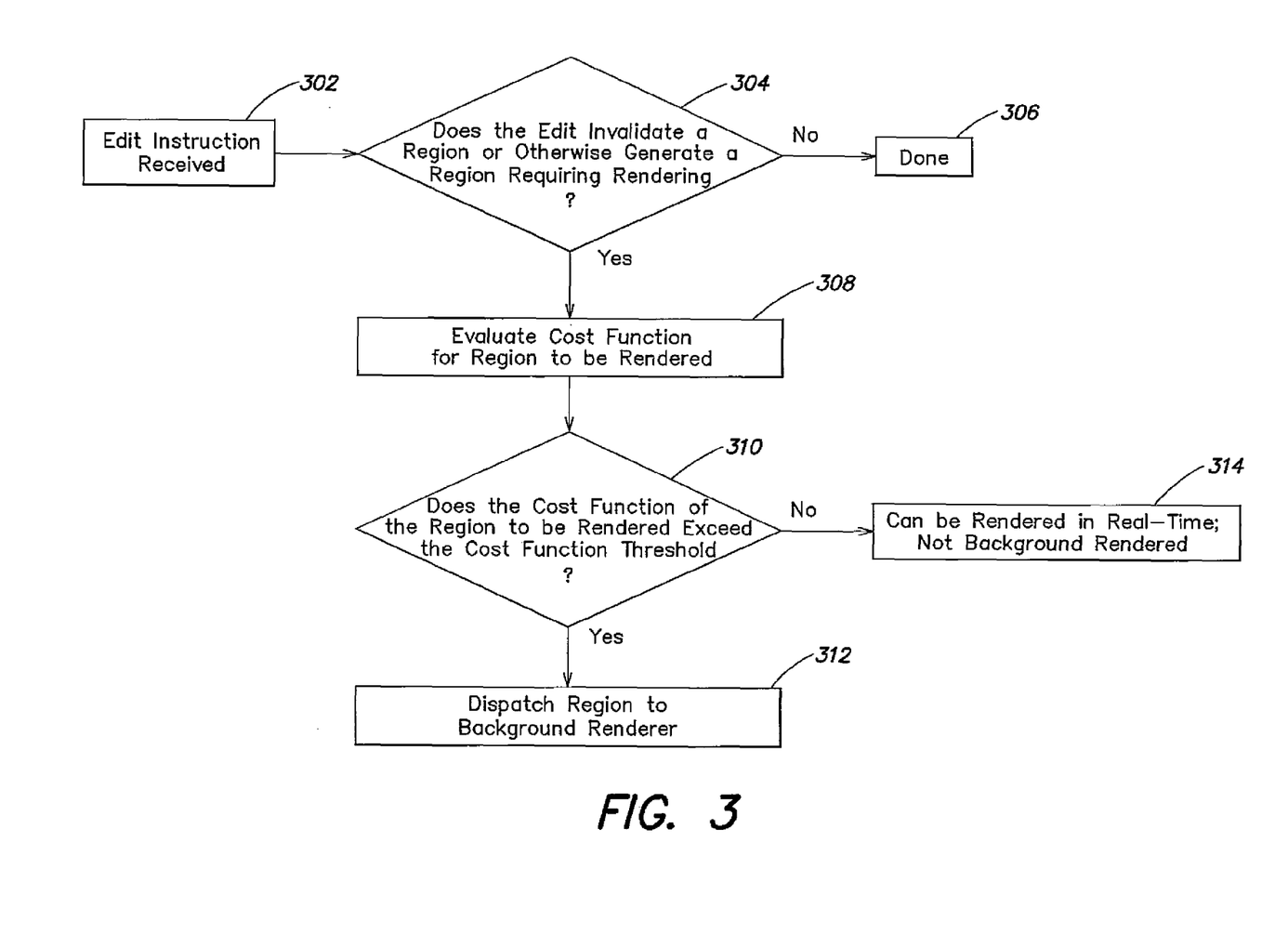
FIG. 3 is a flow diagram illustrating the sequence of events that takes place when a user performs an edit on a video composition.

FIG. 3 is a flow diagram illustrating the sequence of events that takes place when the user performs an edit on the composition. When an edit instruction is received (302), the system determines whether the edit has caused a region of the timeline to change in such a way as to require re-rendering, i.e., to invalidate the region (304). Such an invalidation would be caused, for example, by adding a layer of video, or introducing a video effect. However, trimming out part of a segment, thus shortening the duration of the affected region does not invalidate that region. If the edit command does not invalidate a region, or otherwise cause any region to require rendering, no rendering action is required (306). The system then determines whether the portion of the timeline to be rendered is simple enough so that it can be rendered in real-time by the streaming engine, or whether it is too complex for real-time rendering. This determination is made by evaluating a cost function for the portion (308). The cost function takes into account the number of sources being composited, their resolution (e.g., standard definition (SD) television video or high definition television standard (HDTV)), and the nature of the compositing functions and effects being applied. The cost function also takes the server hardware configuration into account, including CPU clock speed, the number of cores, memory bus speed, and other pertinent specifications that affect the performance of the rendering process. The values of the costs that are aggregated into the cost function are obtained from a look-up table. For example, a chromakey effect may have a normalized complexity of 5, and a 3D warp effect may have complexity of 8. In addition, in some embodiments, the cost values are modified empirically by using measurements of the time taken to render commonly occurring effects for a given number and format of source video layers.

An additional parameter that may be included in the cost function is the preview (or the working) resolution and frame rate to be rendered during the edit phase of the project. This preview resolution and frame rate is determined at the start of a project, and refers to the quality of the video that is generated for the render cache. This is set to the highest quality that may need to be streamed to a client during the edit phase of a project. For example, the user may set the target resolution to correspond to SD NTSC, with a 720×486. In this case, all background rendering is performed at this quality. However, if a client is working over a low bandwidth connection that does not support a video stream of this quality, the client can request a lower resolution stream. The streaming engine then sends the reduced quality stream by downsampling any pre-rendered frames from the render cache, and generating any unrendered frames in real time. On the other hand, if the client is connected to the server over a high bandwidth network, and it is anticipated that the number of users will be low, the user may be able to receive, and the system may be able to stream the preview in HD, in which case the user has the option to select the target resolution and frame rate of the rendering corresponding to 720i, 720p, 1080i or 1080p.

Once the cost function of the region to be rendered is determined, the system compares that with a predetermined cost function threshold (310). In the described embodiment, the cost function threshold is a user-defined value. In other embodiments, the threshold is determined automatically, based on factors including the system configuration and user preferences. If the complexity of an invalid region of the timeline, as determined by the cost function, is above the threshold, the system considers the region complex enough to require background rendering, rather than rely on the ability of the real-time renderer to render it in real time when a request for playback is received. It therefore dispatches the region to the background renderer (312). If the complexity of the invalidated region does not exceed the cost function threshold, the region is not dispatched for background rendering (314) because the region can be rendered in real-time by real-time rendering engine 206 if and when it is requested by the client.

The cost function threshold is set to a level so as to optimize the overall utilization of the server, while maintaining an acceptable level of latency and real-time playback capability for each of the connected users. The level is determined empirically, and is based on system and configuration information that can include the maximum number of users anticipated, the nature of the source material, and other project-related parameters that can affect performance. For example, when the source media is encoded in a form that requires a large amount of processing, such as for example a highly compressed format for which decompression is compute-intensive, the threshold is adjusted upwards in order to avoid dispatching a high proportion of the invalidated regions of the timeline to the background renderer, which would excessively deplete the resources available for the real-time playback, Examples of formats that generate high processing demands are the RED Camera format, Dalsa Bayer formats, and video camera formats that require a nonlinear anamorphic transformation.

In such a high-complexity project, the real-time rendering and streaming engine may not be able to perform the rendering and playback at the resolution requested, and, when that occurs, it controls the streaming frame rate by dropping video frames, while keeping the audio stream intact. If the audio stream is affected, the playback stops, and the streaming engine starts buffering the stream. This situation arises when a region that has been dispatched to the background renderer is required for playback before background rendering has been performed, or when the background rendering facility is turned off, or when the user-defined cost function threshold has, of necessity, been set to a high level of complexity, which raises the complexity of regions designated as renderable in real time. Note, however, that any partial background rendering that has been performed, down to an individual frame level of granularity, may be retrieved from the render cache by the streaming engine, thus improving the quality of the streaming.

The system assigns high priority to real-time rendering and playback; background rendering tasks have a lower priority, using resources that are assigned dynamically, as described below.

In a multi-user environment, the load on the server can change unpredictably as new users log on and start working on their editing projects. Thus, in evaluating whether a particular region on the timeline can be played back in real time, i.e., in setting the cost function threshold, the system uses a conservative estimate of the resources that will be available to a given user at the time that region is streamed to the user.

Figure 4:
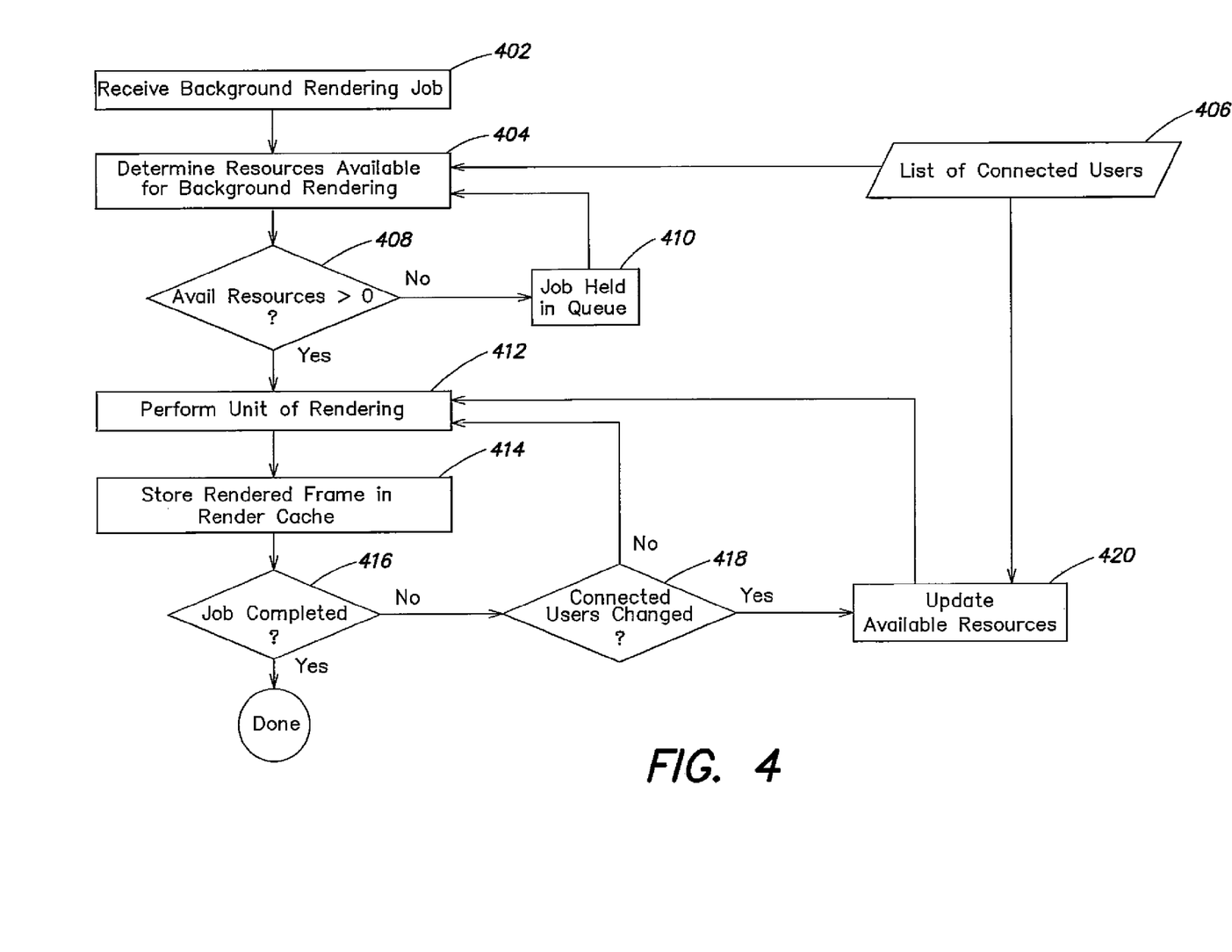
FIG. 4 is a flow diagram illustrating how resources are allocated to background rendering for a given user.

FIG. 4 is a flow diagram illustrating how resources are allocated to background rendering for a given user. When it receives a rendering job (402) dispatched by complexity evaluator and render scheduler (FIG. 2, 210), background renderer 212 determines what resources are currently available to the corresponding user for background rendering (404). This determination takes into account the total processing resources available on the server and the list of users currently connected to the system (406). The following algorithm exemplifies the allocation of resources on the described video editing system. The computing resources of a given server configuration can be represented as a number M of working threads. For example, if a particular server has 8 cores, with each core providing 4 threads, the total number of working threads available is 32. By default, each connected user is allocated an equal fraction of the available threads, but no less than one thread. Thus, in determining what should be sent to the background renderer, the system assumes the worst-case scenario, namely that only a single worker thread will be available to the user. Any region that cannot be rendered in real time using only a single worker thread is therefore sent to the background renderer. Note, regions that can be rendered in real-time with a single thread are not background rendered so as avoid performing computations that may be unnecessary. An example of an unnecessary computation arises when a change to the timeline is undone prior to playback.

In some embodiments, each user is assigned a weight that affects how many resources are assigned to that user, using, for example, the formula:

$$\text{threads\_avail(user)} = \text{tot\_threads\_on\_system} * \text{weight(user)} / \text{no\_of\_users\_connected}.$$

When a user logs in to the system, the number of threads allocated to the one or more users who are already logged in drops in order to free up the number of threads required for the new user, and each of the logged in users may relinquish one or more threads. Conversely, if a user logs off, that user's resources become available for the remaining connected users, and each of them may gain access to one or more additional threads. Thus, the number of threads available to a given connected user can change at any time. As used herein, the term "thread" refers to an arbitrary unit of sever processing resource. The system can set the level of resources associated with a thread in order to optimize a flexible, dynamic disposition of server resources to the connected users.

As illustrated in FIG. 4, if the system determines that no background rendering resources are currently available for a user (408), the background rendering job is held in a queue until resources become available (410). Once resources are available, the background renderer starts rendering (412), and stores each frame rendered in the render cache (414). If the rendering task is not completed (416), the background rendering continues, using the allocated server resources, unless the list of connected users changes (418), in which case the resources that are allocated adjusts (420) to accommodate the new list (406).

The background rendering is prioritized according to various heuristic rules. High priority is given to the region of the timeline where the user's cursor is currently active, based on the assumption that this area is receiving the user's attention, and the user may wish to view the region to evaluate his edits. In some embodiments, regions of high complexity, as determined by evaluation of the cost function, are rendered first, since these would suffer the most deterioration in a play-back stream if the user requested playback prior to completion of the background rendering.

If the user requests playback of a region for which background rendering has been scheduled but not yet completed, the real-time rendering and streaming engine will use all the threads available to the requesting user. If the available resources are not sufficient to perform the rendering at the requested quality in real time, the system reduces the resolution and/or the number of frames per second, gracefully degrading the streaming quality.

When streaming back to the client, the real-time rendering and streaming engine is able to retrieve any portion of the requested playback that is present in the render cache, down to the level of an individual frame. Thus, if any still valid frame is present in the render cache, the streaming engine will retrieve and stream it, thereby ensuring that available resources are applied exclusively to render frames that have not yet been rendered. In addition, each frame rendered in real time by the real-time rendering engine is stored in the render cache. Thus, the render cache is populated by frames that originate from both the background renderer and from the real-time renderer.

Figure 5:
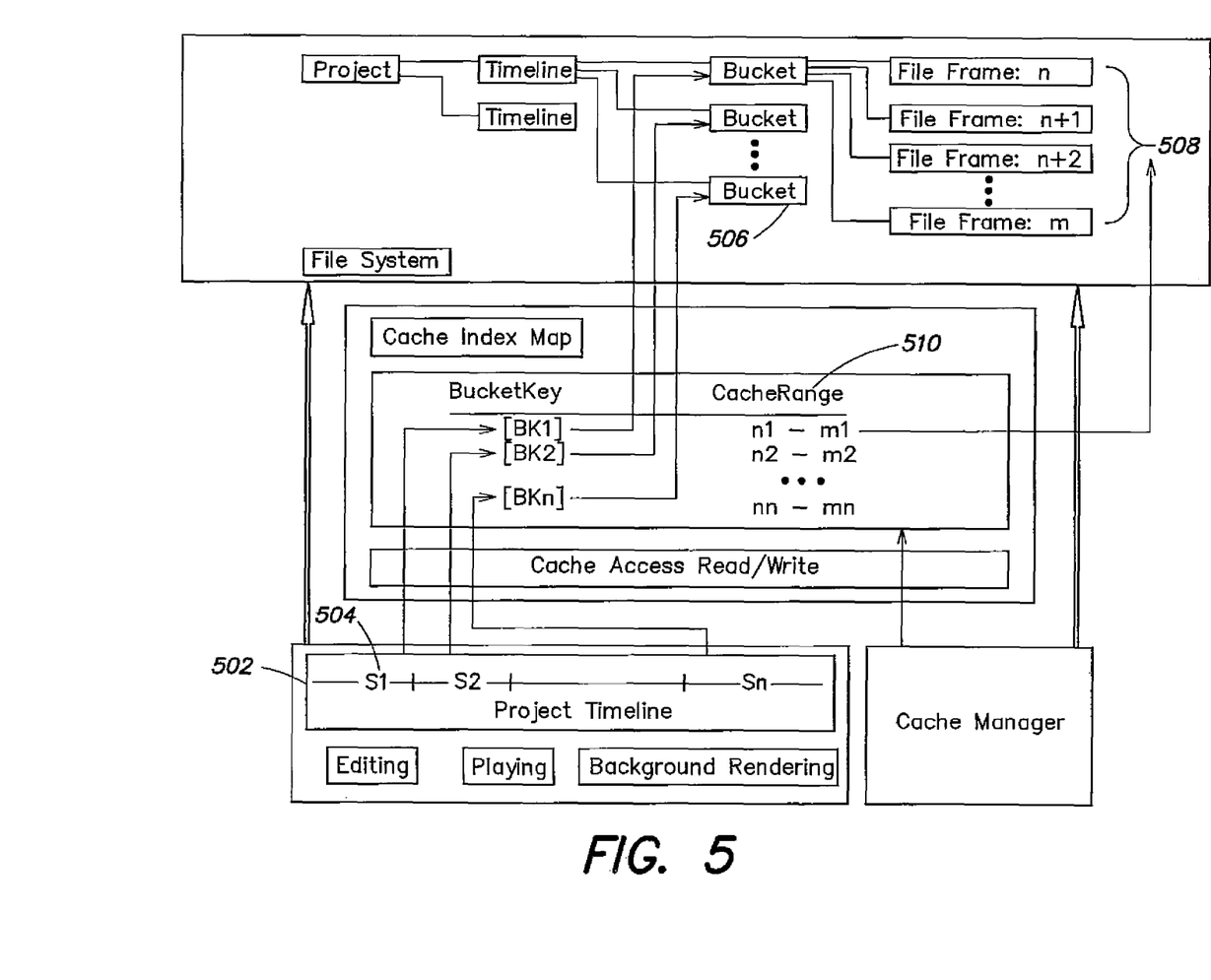
FIG. 5 is a diagram illustrating the render cache structure in the described embodiment.

The streaming engine's ability to assemble the video stream in real time by using a combination of pre-rendered frames from the render cache and frames being rendered in real-time is based on structure of the render cache and its indexing scheme. FIG. 5 is a diagram illustrating the render cache structure. Timeline 502 is sliced into interesting regions based on the locations of edit/effect events, indicated S1, S2, . . . Sn (504). A unique slice identifier (SID) is defined for each region as follows:
SID=SIGN (Func (source, source size, effects, transition, speed, segment relative position, etc.))
where SIGN is a standard digest function, such as MD5 or SHA. The rendering cache entry (BucketKey) for a given region is defined as:
BucketKey=Func (project, timeline, SID).
Within each Bucket 506, the rendered frames files are numbered File_Frame_N, File_Frame_N+1, etc., where the starting number N reflects the offset between track time and rendered cache sequence time (508). The cache range (510) CacheRange for each bucket is defined as range list:
CacheRange=(n1 . . . n2, n3 . . . n4, n5 . . . n6).

The render cache indexes only the current state of each region or frame in the timeline. It uses parameters derived solely from descriptors of the source media, offsets, effects, compositing rules, and so on that uniquely define a region or a frame, independent of the edit command sequence performed in order to obtain the current state of the valid frame or region. The cache index enables the system to rapidly determine whether a currently valid frame or region is present in the render cache. Since the render cache retains all frames that have been rendered throughout the edit phase of a project, no given frame or region is rendered more than once, thereby improving server efficiency. This savings in rendering processing can be quite significant since many editors perform edits to evaluate a particular choice, often deciding to backtrack by undoing commands, or redoing them in a different sequence.

The techniques and methods described herein extend to a multi-server implementation. In such an implementation, one or more of a plurality of servers may be designated as a render server that runs the background renderer, and optionally includes the render cache. The load between multiple servers may be balanced using load balancing techniques, both for embodiments that include one or more render servers and for embodiments in which no server is specifically dedicated to rendering.

Each physical server includes standard hardware and software necessary for its operation, such as central-processing units, graphics processors, an operating system, and user- and system-level libraries. The server's hardware and software may be customized beyond that which is standard to improve the performance of video-editing tasks, such as, for example, encoding or decoding processing-intensive media compression schemes.

As users log into the server, the server creates separate processes for each user. Each process may be isolated from other processes. A load-balancing module may automatically determine which of the in servers is best suited to execute a new user request. The load balancing module uses as input parameters that express the processing power of the servers being balanced, together with user-defined parameters that express desired weighting of the various factors in the load balancer. For each server, CPU usage, memory usage is tracked, as well as the total number of active connections to system across all servers. In one embodiment, the load balancer computes the load on a server as a function of the processing capacity of the server and the current CPU and memory usage, and selects the server with the lowest load to take on a new user connection. The function may be linearly weighted by user-defined parameters, as follows:

connection_usage=total_connections*100/server_capacity;

server_load=cpu weight*cpu_usage+
memory_weight*memory_usage+
connection_weight*connection usage.

The server may accept new user requests from an arbitrarily large number of users; nothing in the system architecture of the present invention sets a maximum number of users. In some embodiments, however, the number of users may exceed the resources available on a given system. For example, the bandwidth to or from the server-side storage may become saturated or the processing power of the server may be exceeded. A long-term solution may be to increase the appropriate resources of the server. In the short term, however, the server may throttle back the bandwidth and/or processing resources used to host each client without affecting editing accuracy. For example, the server may temporarily reduce the frame rate and/or size of the streams sent to each client. Alternatively, a client requesting a complicated editing task may be informed that the result of the task is not viewable in real time. Once the resource shortage is resolved, the server may return to normal operation.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIGS. 2 and 3 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A system for remote video editing, the system comprising:
   a storage device for storing a source media file;
   an input for receiving, over a network, video editing commands pertaining to the source media file;
   a virtual representation of edited media, the virtual representation comprising the editing commands and a link to the source media file;
   a complexity evaluator that determines a complexity for rendering a proxy representation of a region of the virtual representation of the edited media, wherein rendering involves applying the received video editing commands for the region to the source media file;
   a render scheduler that dispatches the region for rendering to a background rendering engine if the complexity for rendering the proxy representation of the region exceeds a predetermined threshold, wherein the background rendering engine renders the region by applying the received editing commands to a portion of the source media file corresponding to the region and stores the rendered region in a render cache; and
   a media delivery engine that delivers the rendered proxy representation of the edited media, wherein for each region of the virtual representation of the edited media, if a rendering of the region is present in the render cache, the media delivery engine retrieves the rendering of the region from the render cache and transmits the rendering of the region over the network, and if a rendering of the region is not present in the render cache, the media delivery engine retrieves a portion of the source media file corresponding to the region, renders the region in real-time using a real-time rendering engine by applying the received video editing commands to the retrieved portion of the source media file, and transmits the rendering of the region over the network.

2. The system of claim 1, wherein the real-time rendering engine stores the rendered region in the rendering cache.

3. The system of claim 1, wherein the proxy representation is a video stream and the media delivery engine is a streaming engine.

4. The system of claim 1, wherein the region of the virtual representation of the edited media comprises one or more frames of the source media file having the video editing commands applied thereto.

5. The remote video editing system of claim 1, wherein a first user is connected to the video editing system over the network, and the video editing system is configured to receive, over the network, video editing commands from the first user, the commands from the first user being associated with the virtual representation of the edited media.

6. The remote video system of claim 5 further comprising a plurality of virtual representations of edited media including the first-mentioned virtual representation of the edited media, each of the plurality of virtual representations being associated with one of a plurality of users connected to the video editing system over the network, the plurality of users including the first user, wherein the video editing system is configured to receive, over the network, video editing commands from each of the plurality of connected users, each received command pertaining to one of the plurality of virtual representations associated with the one of the plurality of users from whom the command was received.

7. The remote video editing system of claim 6, wherein a processing resource level allocated to one or more of the plurality of connected users is dynamically dependent on the number of connected users.

8. The remote video editing system of claim 7, wherein the processing resource level allocated to one or more of the plurality of connected users includes an allocation for background rendering.

9. The remote video editing system of claim 7, wherein the processing resource level allocated to one or more of the plurality of connected users includes an allocation of foreground processing resources for real-time rendering and transmitting the proxy representation over the network.

10. The remote video editing system of claim 6, wherein a processing resource level allocated to a connected user is based in part on a weight assigned to the user.

11. A system for remote video editing comprising:
    a client comprising:
    (a) an input for receiving a proxy representation of edited media;
    (b) a processor for decoding the proxy representation;
    (c) a graphical user interface for displaying content represented by the decoded proxy representation;

(d) a user input for facilitating entry of commands for editing the proxy representation; and an (e) output for transmitting the editing commands, and a server for receiving the editing commands, applying the editing commands to a source media file, and generating the proxy representation of edited media in accordance with the source media file and the editing commands, wherein, the proxy representation is generated by a background process for regions of the source media file for which applying the editing commands involves a computational load exceeding a predetermined threshold, and the proxy representation is generated in real-time for regions of the source file for which applying the editing commands involves a computational load below the predetermined threshold.

12. The system of claim 11, wherein the client is one of a desktop computer, workstation, laptop computer, netbook, and smartphone.

13. The system of claim 11, wherein the proxy representation comprises a media stream.

14. The system of claim 11, wherein the proxy representation includes one or more individual frames requested via the user input, the one or more individual frames corresponding to application of the editing commands to the source media file.

15. A method for remotely editing a video file, the method comprising:

receiving, at a server, a video editing command from a remote client;

modifying, at the server, a virtual representation of an edited media file in accordance with the received command, the virtual representation comprising a reference to a source media file stored on a storage device, the storage device being connected to the server over a high-speed link; and rendering and transmitting, from the server to the remote client, a proxy representation of the source media file modified by the editing command, wherein regions of the proxy representation for which rendering the proxy representation requires computational resources that exceed a threshold are rendered by a background rendering process, and wherein the remaining regions of the proxy representation are rendered in real time.

16. The method of claim 15, wherein the server includes a plurality of virtual representations, and further comprising receiving video editing commands from a plurality of remote clients, each of the remote clients being associated with a corresponding virtual representation, wherein each of the editing commands pertains to the one of the plurality of virtual representations corresponding to the client from which the command was received.

17. The method of claim 16, wherein a server processing resource level allocated to one or more of the plurality of remote clients is dynamically dependent on a number of remote clients connected to the server.

18. The method of claim 17, wherein the processing resource level allocated to one or more of the plurality of remote clients includes an allocation for background rendering.

19. The method of claim 17, wherein the processing resource level allocated to one or more of the plurality of remote clients includes an allocation of foreground processing resources for real-time rendering, and transmitting the proxy representation.

20. The remote video editing system of claim 16, wherein a processing resource level allocated to a remote client is based in part on a weight assigned to the client.

21. The method of claim 15, wherein the proxy representation comprises a video stream.

22. The method of claim 15, wherein the server stores the proxy representation in a rendering cache.

* * * * *